United States Patent Office 3,047,587
Patented July 31, 1962

---

3,047,587
PROCESS FOR PREPARING 2-FLUOROALKYL-5-NITROFURANS
William R. Sherman, Lake Forest, Ill., assignor to Abbott Laboratories, North Chicago, Ill., a corporation of Illinois
No Drawing. Filed May 12, 1960, Ser. No. 28,544
6 Claims. (Cl. 260—346.1)

This invention is directed to new and useful compounds corresponding to the formula

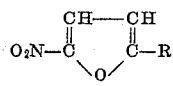

wherein R represents difluoromethyl, trifluoromethyl or α,α-difluoroethyl. These compounds are mobile liquids very soluble in the usual organic solvents but substantially insoluble in water. They are useful as antifungal agents and more particularly, as antibacterial agents. As such, they are adapted to be employed as active toxic constituents of disinfectant compositions for the control of bacterial microorganisms such as *Escherichia coli, Proteus vulgaris* and *Straphylococcus aureus*. For such use, the compounds may be dispersed on an inert, finely divided solid and employed as a dust. Alternatively, they may be dispersed in water and employed as a spray. The products may likewise be employed as constituents of oil and water emulsions with or without a wetting, dispersing or emulsifying agent. In representative operations, 2-difluoromethyl-5-nitrofuran gave complete inhibition of the growth of *Escherichia coli, Salmonella typhimurium* and *Staphylococcus aureus* when employed as an aqueous composition containing 25 parts by weight of said compound per million parts by weight of ultimate mixture.

The compounds of the present invention can be prepared by the reaction of at least two molecular proportions of sulphur tetrafluoride with one molecular proportion of 5-nitro-2-furaldehyde, 2-acetyl-5-nitrofuran or 5-nitro-2-furoic acid in a closed reaction vessel such as a stainless steel bomb under autogenous pressure and at a temperature of from 50° to 150° C. When the reaction is complete, the reaction product is extracted with a suitable solvent such as chloroform or carbon tetrachloride, the solvent evaporated and the residue fractionally distilled under reduced pressure to obtain the desired product as a mobile liquid.

The following examples illustrate several specific embodiments of the invention but are not to be construed as limitations thereof.

EXAMPLE 1

*2-Trifluoromethyl-5-Nitrofuran*

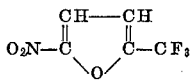

A stainless steel bomb charged with 15.7 grams (0.1 mole) of 5-nitro-2-furoic acid and 43 grams (0.4 mole) of sulphur tetrafluoride was heated at 120° C. for 7 hours under autogenous pressure. The reaction product was extracted with chloroform, the chloroform extract washed successively with a dilute aqueous sodium carbonate solution and water, dried and the solvent thereafter removed. The resulting residue was fractionally distilled to obtain the desired 2-trifluoromethyl-5-nitrofuran as a light yellow liquid boiling at 108° C. at 102 mm. pressure and having a refractive index n/D of 1.4368 at 25° C. *Analysis.*—Calcd. for $C_5H_2F_3NO_3$: C=33.16%; H=1.11%. Found: C=33.39%; H=1.39%.

EXAMPLE 2

*2-Difluoromethyl-5-Nitrofuran*

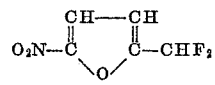

This compound was prepared by heating a mixture of 42 grams (0.39 mole) of sulphur tetrafluoride and 26.4 grams (0.187 mole) of 5-nitro-2-furaldehyde in a stainless steel bomb for 8 hours at 65° C. under autogenous pressure. The reaction mixture was then processed as described in Example 1 to obtain the desired 2-difluoromethyl-5-nitrofuran as a liquid boiling at 96°–98° C. at 13 mm. pressure. The compound was found to contain 36.88% carbon and 8.56% nitrogen compared to the calculated values of 36.82% and 8.59%, respectively.

EXAMPLE 3

*2-(α,α-Difluoromethyl)-5-Nitrofuran*

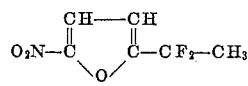

A mixture of 63 grams (0.575 mole) of sulphur tetrafluoride, 31 grams (0.2 mole) of 2-acetyl-5-nitrofuran and one milliliter of water was heated in a stainless steel bomb at 75° C. for 10 hours under autogenous pressure. The water was added to generate hydrofluoric acid which catalyzed the reaction. The reaction mixture was thereafter processed as described in Example 1 to obtain the desired 2-(α,α-difluoroethyl)-5-nitrofuran which boiled at 58°–60° C. at 0.5 mm. pressure and had a refractive index n/D of 1.4717 at 25° C. Upon analysis, the compound was found to contain 7.98% nitrogen as compared to the calculated value of 7.91% nitrogen.

What I claim is:
1. 2-difluoromethyl-5-nitrofuran.
2. 2-(α,α-difluoroethyl)-5-nitrofuran.
3. A method for the preparation of a compound corresponding to the formula

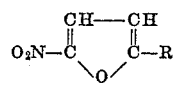

wherein R is selected from the group consisting of difluoromethyl, trifluoromethyl and α,α-difluoroethyl which comprises heating a mixture of sulphur tetrafluoride and a compound selected from the group consisting of 5-nitro-2-furaldehyde, 2-acetyl-5-nitrofuran and 5-nitro-furoic acid in a closed reaction vessel at a temperature of from 50° C. to 150° C. under autogenous pressure and recovering the resulting product from the reaction mixture.

4. A method for the preparation of 2-trifluoromethyl-5-nitrofuran which comprises heating a mixture of at least two molecular proportions of sulphur tetrafluoride and one molecular proportion of 5-nitro-2-furoic acid in a closed reaction vessel at a temperature of about 120° C. under autogenous pressure.

5. A method for the preparation of 2-difluoromethyl-5-nitrofuran which comprises heating a mixture of at least two molecular proportions of sulphur tetrafluoride and one molecular proportion of 5-nitro-2-furaldehyde in a closed reaction vessel at a temperature of about 65° C. under autogenous pressure.

6. A method for the preparation of 2-($\alpha,\alpha$-difluoroethyl)-5-nitrofuran which comprises heating a mixture of at least two molecular proporotions of sulphur tetrafluoride and one molecular proportion of 2-acetyl-5-nitrofuran in a closed reaction vessel at a temperature of about 75° C. under autogenous pressure.

References Cited in the file of this patent

Ward et al.: J. Am. Pharm. Assoc., Sci. Ed., vol. 37 (1948), pages 317–9.

Yale: J. Med. and Pharm. Chem., vol. 1, No. 2 (1959), pages 121–133 (pages 121–2 particularly relied on).